US012339545B2

(12) United States Patent
Wheeler et al.

(10) Patent No.: US 12,339,545 B2
(45) Date of Patent: Jun. 24, 2025

(54) PRODUCING LIQUID CRYSTAL ASSEMBLIES

(71) Applicant: Flexenable Technology Limited, Cambridge (GB)

(72) Inventors: May Wheeler, Cambridge (GB); William Reeves, Cambridge (GB)

(73) Assignee: Flexenable Technology Limited, Cambridge (GB)

( * ) Notice: Subject to any disclaimer, the term of this patent is extended or adjusted under 35 U.S.C. 154(b) by 0 days.

(21) Appl. No.: 18/034,828

(22) PCT Filed: Nov. 2, 2021

(86) PCT No.: PCT/EP2021/080406
§ 371 (c)(1),
(2) Date: May 1, 2023

(87) PCT Pub. No.: WO2022/090574
PCT Pub. Date: May 5, 2022

(65) Prior Publication Data
US 2023/0400736 A1  Dec. 14, 2023

(30) Foreign Application Priority Data
Nov. 2, 2020  (GB) ..................... 2017360

(51) Int. Cl.
*G02F 1/1339*  (2006.01)
(52) U.S. Cl.
CPC ...... *G02F 1/13396* (2021.01); *G02F 1/13398* (2021.01)

(58) Field of Classification Search
CPC ............... G02F 1/13396; G02F 1/1303; G02F 1/133605; G02F 1/133615; G02F 1/136286; G02F 2201/123; G02F 1/13398
See application file for complete search history.

(56) References Cited

U.S. PATENT DOCUMENTS

| 2010/0208190 A1* | 8/2010 | Yoshida ................ G02F 1/1303 445/25 |
| 2011/0068492 A1* | 3/2011 | Chen ................. G02F 1/133305 349/84 |
| 2017/0260452 A1* | 9/2017 | Kwon .................... C09K 19/54 |

FOREIGN PATENT DOCUMENTS

CN  103149744 B  4/2016

OTHER PUBLICATIONS

Search Report from corresponding International Patent Application No. PCT/EP2021/080406, dated Feb. 2, 2022.

* cited by examiner

*Primary Examiner* — James A Dudek
(74) *Attorney, Agent, or Firm* — Dergosits & Noah LLP; Todd A. Noah

(57) ABSTRACT

A technique, comprising: producing an assembly in preparation for a later process of permanently stretching one or more parts of the assembly; wherein the assembly comprises an amount of liquid crystal material in a region laterally bounded by a lateral barrier; and wherein producing the assembly comprises determining the amount of LC material, based at least partly on one or more parameters of the later stretching process.

13 Claims, 8 Drawing Sheets

PRODUCING LIQUID CRYSTAL ASSEMBLIES

This patent application is a U.S. National Phase of International Patent Application No. PCT/EP2021/080406, filed Nov. 2, 2021, which claims priority to Great Britain Patent Application No. 2017360.5, filed Nov. 2, 2020, each of which is incorporated by reference in its entirety.

The present application relates to producing liquid crystal (LC) assemblies in preparation for permanently stretching one or more parts of the assemblies to, for example, create curved profiles in the assemblies.

The inventors for the present application have worked on producing LC assemblies in preparation for later subjecting the LC assemblies to a process involving permanently stretching one or more parts of the LC assemblies, to, for example, create in the LC assemblies a curved profile. With reference to FIGS. 14 and 15, the inventors have identified the problem of producing LC assemblies that are better resistant to the occurrence of optical defects in the active region when later permanently stretching one or more parts of the LC assemblies to e.g. create a curved profile in the LC assemblies.

There is hereby provided a method, comprising: producing an assembly in preparation for a later process of permanently stretching one or more parts of the assembly; wherein the assembly comprises an amount of liquid crystal material in a region laterally bounded by a lateral barrier; and wherein producing the assembly comprises determining the amount of LC material, based at least partly on one or more parameters of the later stretching process.

The one or more parameters may comprise a change in area of the region caused by the stretching process.

The stretching process may comprise: heating the assembly to a molding temperature above a glass transition temperature of one or more support films of the assembly; molding the assembly at the molding temperature to stretch one or more parts of the assembly; and then cooling the molded assembly.

Molding the assembly may comprise creating a curved profile in the assembly.

The assembly may comprise spacers defining one or more spaces for the liquid crystal material between two components of the assembly; and the one or more parameters of the stretching process may comprise a change in one or more dimensions of the spacers caused by the stretching process.

The one or more dimensions of the spacers may comprise a total cross-sectional area of the spacers and a height of the spacers.

The spacers may comprise an array of spacers forming an integral part of one or both of the two components of the assembly.

The one or more parameters of the stretching process may comprise a volume reduction arising from one or more local compressions of the assembly caused by the stretching process.

There is also hereby provided a method, comprising: producing an assembly in preparation for creating in the assembly a curved profile comprising a change in curvature in a first region of the assembly, wherein the assembly comprises liquid crystal material contained between two halves of the assembly in a region bounded by a barrier; and wherein producing the assembly involves locating the barrier in the first region of the assembly.

The change in curvature may comprise a curvature inversion.

The change in curvature may comprise a change from a lower curvature inwards of the first region to a higher curvature outward of the first region.

Creating the curved profile in the assembly may comprise biaxial distortion of the assembly, and the first region bounds an inner region of the assembly.

The barrier may comprise adhesive that bonds the two halves of the assembly together.

The barrier may be defined by a spacer layer forming part of one of the halves of the assembly, and the spacer layer may also define an array of spacer columns.

The halves of the assembly may be bonded together by adhesive located outwards of the barrier.

There is also hereby provided a method, comprising: producing an assembly in preparation for creating in the assembly a curved profile comprising a change in curvature in a first region of the assembly, wherein the assembly comprises liquid crystal material contained between two halves of the assembly, wherein at least one of the halves of the assembly defines spacer columns in at least an active region of the assembly; and wherein producing the assembly involves varying a configuration of the spacer columns across the active region in accordance with a variation in pressure applied to the assembly across the active region when creating the curved profile.

Varying a configuration of the spacer columns across the active region may comprise varying a starting height of the spacer columns across the active region.

Varying a configuration of the spacer columns across the active region may comprise varying the area density of spacer columns across the active region.

Varying the area density of spacer columns across the active region may comprise varying the number of spacer columns per unit area.

Varying the area density of spacer columns across the active region may comprise varying the cross-sectional area of individual spacer columns.

There is also hereby provided a method, comprising: producing an assembly in preparation for creating in the assembly a curved profile comprising a change in curvature; wherein the assembly comprises liquid crystal material contained between two halves of the assembly in a region bounded by a barrier; and wherein producing the assembly comprises involves determining an amount for the LC material contained between the two halves of the assembly within the barrier, taking into account at least a variation in degree of compression of the assembly across the region bounded by the barrier when creating the curved profile in the assembly.

Embodiments of the invention are described in detail hereunder, by way of example only, with reference to the attached drawings, in which.

We first describe an example of a thermo-forming process used to explain a LC intermediate assembly production process according to an embodiment of the first invention. However, the LC intermediate assembly production process is also applicable to other methods of stretching one or more parts of a LC assembly to e.g. create a permanent curved profile in a LC intermediate assembly.

Figure 14:
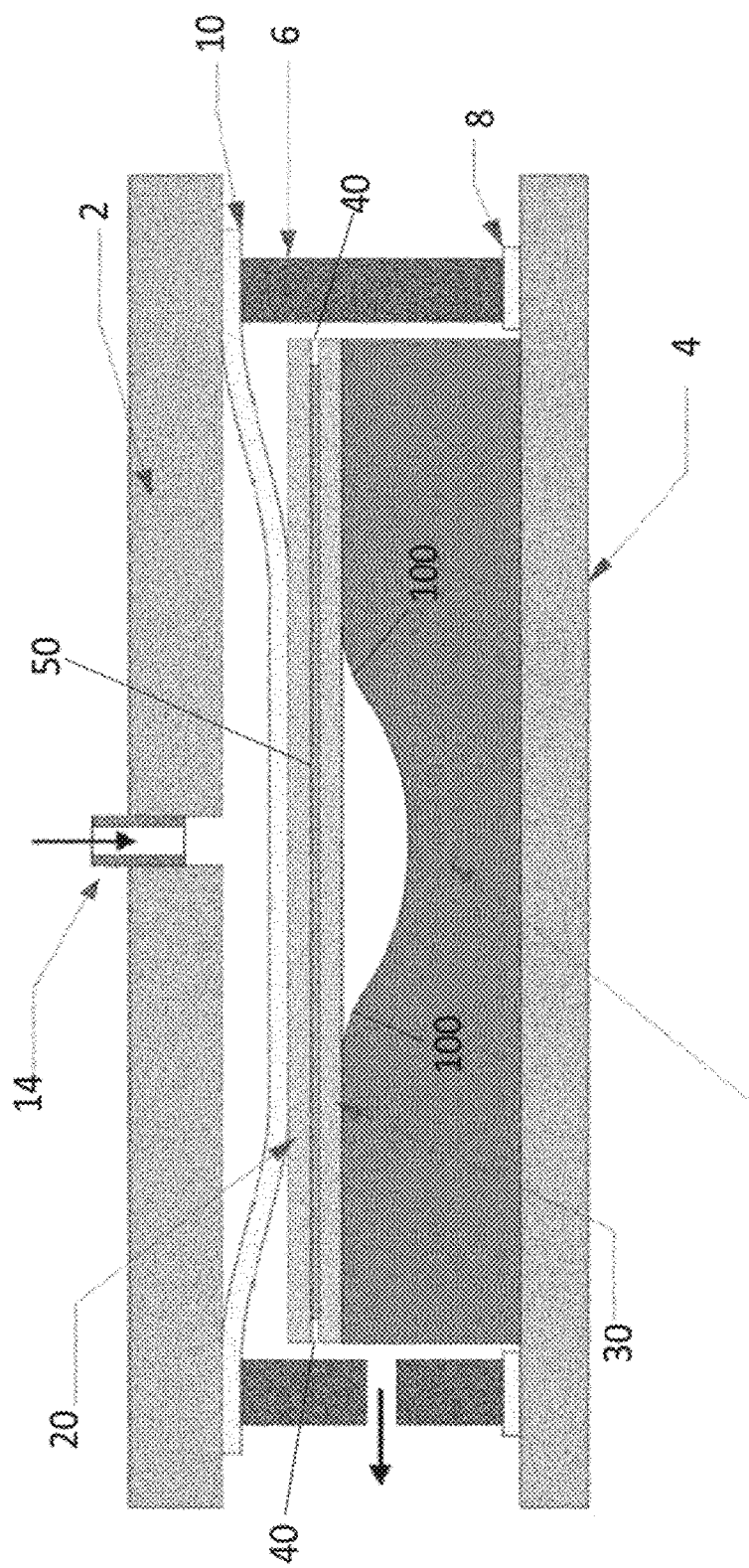
FIG. 14 illustrates a forming technique for creating a curved profile in a LC intermediate assembly.

With reference to FIG. 14, one example of a stretching process for creating a permanent curved profile in a LC intermediate assembly uses a thermo-forming apparatus/jig. In this example, the LC intermediate assembly comprises a lower plastics film component 30 and an upper plastics film component 20, and LC material 50 contained between the two plastics film components 20, 30. The two plastics film components 20, 30 are bonded together by an adhesive frame 40 at the perimeter of the LC intermediate assembly. The adhesive frame 40 also functions as a sealant barrier to limit lateral spread of the LC material 50. Each plastics film component 20, 30 comprises a thermoformable plastics support film. In this example, the plastics film components also each comprise a conductor layer (e.g. inorganic metallic layer) formed in situ on the plastics support film, and an LC alignment layer formed in situ on the plastic support film over the conductor layer. The conductor layers are exposed at an edge of the LC intermediate assembly to facilitate the application of a voltage across the two conductor layers. The LC alignment layers determine the molecular orientation (LC director) of the LC material in the absence of an over-riding electric field generated in the LC material by the application of a voltage across the two conductor layers on opposite sides of the LC material 50. Changing the voltage across the two conductor layers can thus be used to control the molecular orientation of the LC material, and thereby control one or more optical properties of the LC material. In this example, the LC intermediate assembly is of a relatively simple construction according to which the conductor layers of both plastics film components extend across the whole of the active region, and one or more optical properties of the whole of the active region are controllable by one electrical input. However, the technique is equally applicable to more complex LC intermediate assemblies. One or both of the plastics film components 20, 30 may also define an array of spacer columns in the active region.

One or both of the plastics film components may comprise additional elements including e.g. one or more of the following: polariser/wave plate film, antireflection film, hard coating, mechanical backing.

The LC intermediate assembly is placed on top of a forming plate/mold 12 supported on a base plate 4. The top cover of the thermo-forming apparatus is then fitted and clamped to the base plate 4. The top cover comprises a top plate 2 supporting downwardly extending walls 6 which completely surround the forming plate/mold 12 and interface with the base plate 4 via a silicone seal 8. The top plate 2 also supports a silicone diaphragm 10 at the bottom surface of the top plate 2. The whole of the thermo-forming apparatus (with the LC intermediate assembly inside) is placed in an oven. The oven is controlled such that the temperature measured/monitored inside the oven is maintained at a set-point temperature (which is above the glass transition temperature of the plastics support films of the LC intermediate assembly). When the oven is at this temperature, pressurized gas (e.g. air or nitrogen) is controllably introduced via inlet 14 into between the bottom surface of the top plate 2 and the expandable silicon diaphragm 10 to ramp the pressure that the silicone diaphragm applies to the LC intermediate assembly (under the expansion of the silicone diaphragm 10). Under the pressure applied by the silicone diaphragm 10, the LC intermediate assembly (at a temperature above the glass transition temperature of the plastics support films of the LC intermediate assembly) adopts the profile of the mold 12. After a predetermined process time, the oven is controlled to bring the temperature inside the oven down to a lower temperature (below the glass transition temperature of the plastics support films of the LC intermediate assembly). The pressurized gas between the top plate 2 and the silicone diaphragm 10 is then controllably released to gradually equalise the pressure on opposite sides of the silicone diaphragm 10; and thus ramp down the pressure that the silicone diaphragm 10 applies to the LC intermediate assembly. The LC intermediate assembly retains the profile of the mold 12 without any wrinkles.

Figure 5:
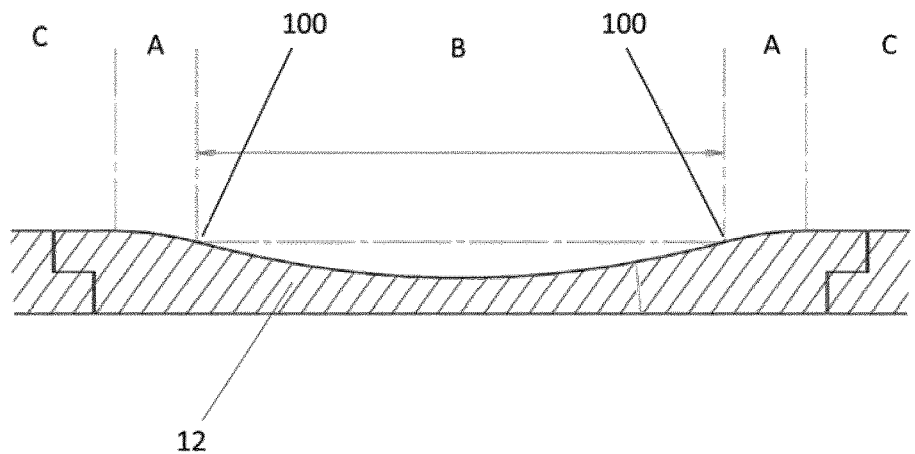
FIG. 5 is a cross-sectional illustration of the curved part of the mold used in FIG. 4.
Figure 6:
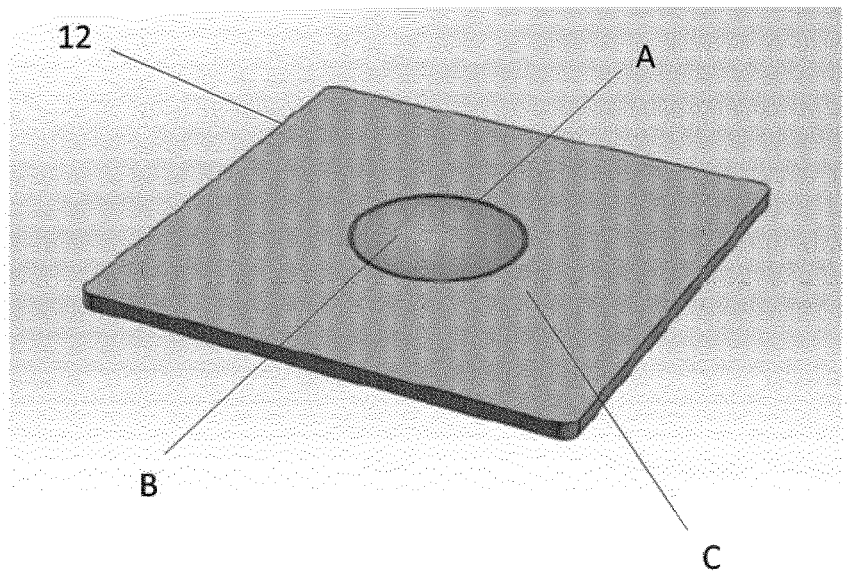
FIG. 6 is a perspective illustration of the mold used in FIG. 4.

With reference to FIGS. 5 and 6, the mold 12 used in this example has a profile comprising: a bi-axial curved central region B having a uniform curvature; an outer flat region C; and a bi-axial curved transition region A linking regions B and C. The profile of region B is that of a portion of a sphere shell. Transition region A is designed to manage the transition between region B and flat region C, and avoid a sharp radius of curvature.

Transition region A has a uniform curvature which (i) is in the opposite direction to that of region B, and (ii) has a higher degree of curvature than that of region B. The degree of curvature here refers to the reciprocal of the radius of curvature. In this example, the radius of curvature of region B is about 3 times greater than the radius of curvature of region A. A curvature inversion 100 occurs at the join between regions A and B.

Figure 15:
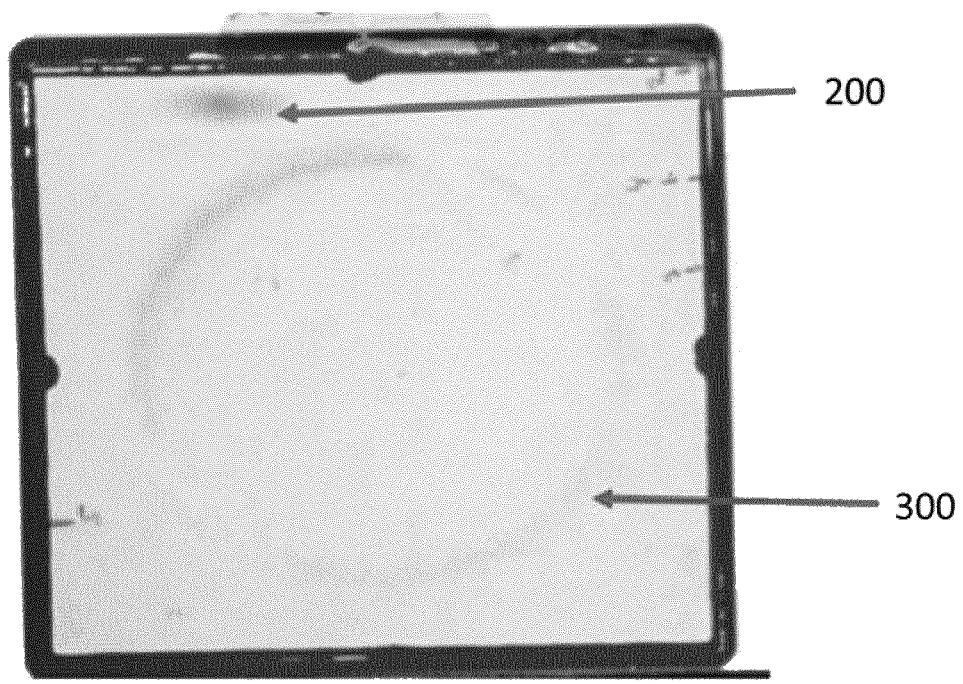
FIG. 15 is an image through crossed polarisers of a curved profile LC assembly formed according to the forming technique of FIG. 14 without any of the modifications devised by the inventors of the present application.

With reference to the image of FIG. 15, the inventors for the present application have found that the thermoforming process can result in optical defects if the LC intermediate assembly is produced according to a method that has been used for the production of flexible plastics LC devices that are capable of being forcibly bent about a single bending axis without producing optical defects in the active region. The image of FIG. 15 is an image of the thermo-formed LC intermediate assembly between crossed polarisers. The yellow colouring 200 indicates an excessive thickness of LC material, and the blue coloring 300 indicates an insufficient thickness of LC material.

Figure 1:
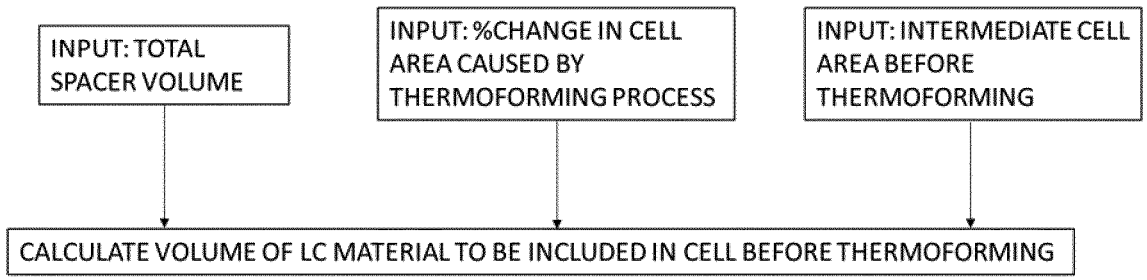
FIG. 1 illustrates an example technique according to an embodiment.

FIG. 1 illustrates a technique according to a first embodiment of the present invention.

According to this first example embodiment, the process of producing the LC intermediate assembly described above is modified by determining the amount of LC material 50 for the LC intermediate assembly based at least partly on one or more parameters of the thermoforming process.

In this first example embodiment, the one or more parameters of the thermoforming process comprise the change, caused by the thermoforming process, in area of the region bound by the adhesive/sealant frame barrier 40 that prevents lateral spread of the LC material. In the below description, the area of this region is referred to as the cell area. The volume of LC material is determined according to the following equation:

Volume of LC material to be used=(Intermediate Cell Area)×(% change in cell area caused by thermoforming process)−(total volume of spacers within cell area). Equation (1):

The intermediate cell area is the size of the cell area before the thermoforming process.

For thermoforming processes in which the change in cell area is different between the two plastics film components 20, 30 constituting the assembly, the change in cell area in the equation (1) above is the average of the change in cell area for the two plastics film components 20, 30.

The change in cell area caused by a thermoforming process may, for example, be calculated from computer-aided-design (CAD) simulation, and/or by experimental testing during a setup stage of the manufacturing process.

For the example that the spacers comprise spacer columns forming an integral part of one or more of the two plastics film components 20, 30: the total spacer volume within the cell area is: (average spacer column height)×(average cross-sectional area of single spacer column)×(number of spacer columns within the cell area).

Some techniques of mass producing a series or array of intermediate LC assemblies together from common large area plastics sheets (mother panels) can result in some variations in spacer column dimensions (spacer column height and/or spacer column cross-sectional area) across the relatively large area of the mother panels; and the average spacer column dimensions for one LC intermediate assembly of a set produced from large area mother panels can be different to the average spacer column dimensions for another LC intermediate assembly of the same set produced from the same large area mother panels. These differences can be taken into account in equation (1) above by using a respective value for the total volume of spacers within the cell area according to the position occupied by the respective LC intermediate assembly in the set of assemblies produced from the same large area mother panels.

In the example described above, it is assumed that the stretching caused by the thermoforming process does not change the total spacer volume within the cell area, or that any change in total spacer volume caused by the thermoforming process is negligible.

Figure 2:
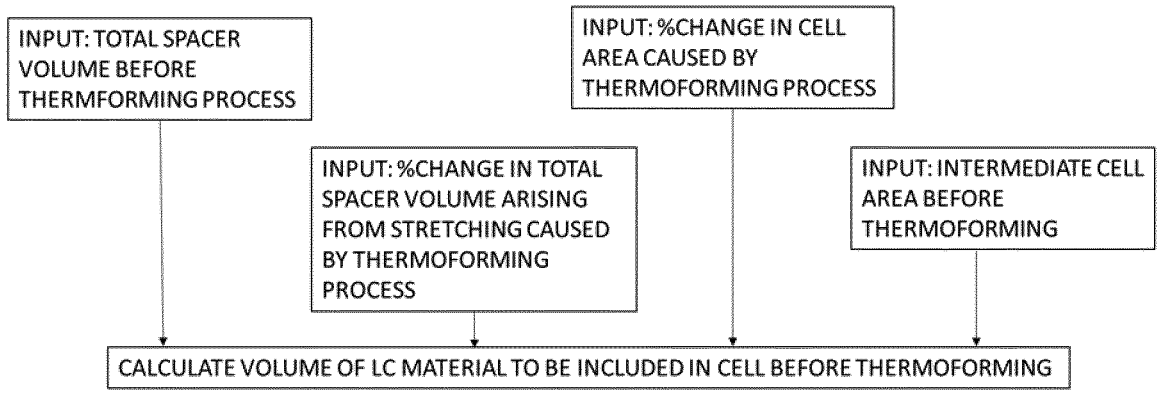
FIG. 2 illustrates an example variation of the technique of FIG. 1.
Figure 3:
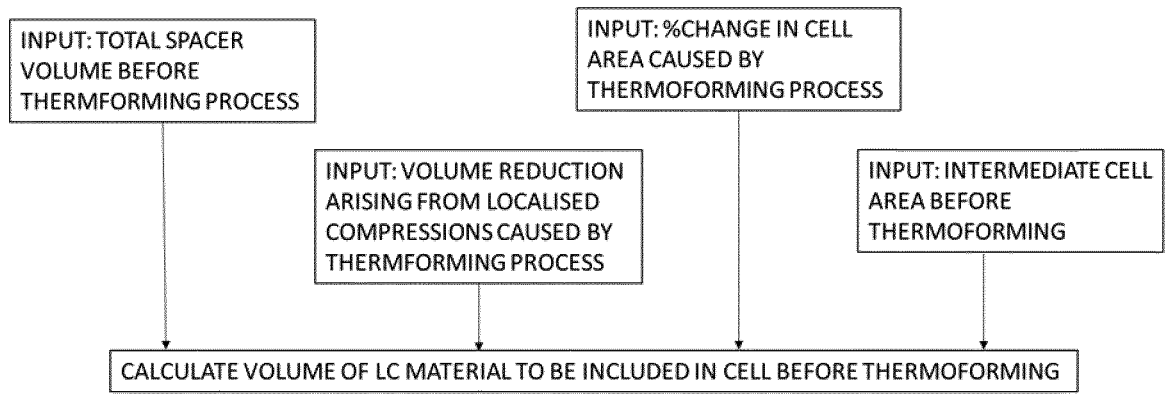
FIG. 3 illustrates another example variation of the technique of FIG. 1.

According to one variation of the technique illustrated by FIG. 2, equation (1) is modified to additionally take account of a percentage change in total spacer volume (due to a change in average spacer column height and/or a change in average spacer column cross-sectional area) arising from stretching caused by the thermoforming process, Volume of LC material to be used=(Intermediate Cell Area)×(% change in cell area caused by thermoforming process)−[(total volume of spacers within cell area)×(% change in spacer volume arising from stretching caused by the thermoforming process)]. Equation (1A):

Some thermoforming processes may involve localised compression of the spacer columns in one or more areas. As illustrated by FIG. 3, volume reductions arising from local compressions caused by the thermoforming process may be taken into account when determining the amount of LC material 50.

Equation (1) may be modified as follows.

Volume of LC material to be used=(Intermediate Cell Area)×(% change in cell area caused by thermoforming process)−(total volume of spacers within cell area)−(sum of volume reductions arising from local cell compressions caused by the thermoforming process). Equation (1B):

Local cell compressions may occur, for example, at transition regions in the profile created by the thermoforming process. A transition region may be characterised by a change in the radius of curvature of the profile. The size of a volume reduction at a transition region may depend, for example, on the compressibility of the spacer columns, the magnitude of the pressure to which the assembly is subjected during the thermoforming process, and the sharpness of the change in radius of curvature at the transition region.

Figure 4:
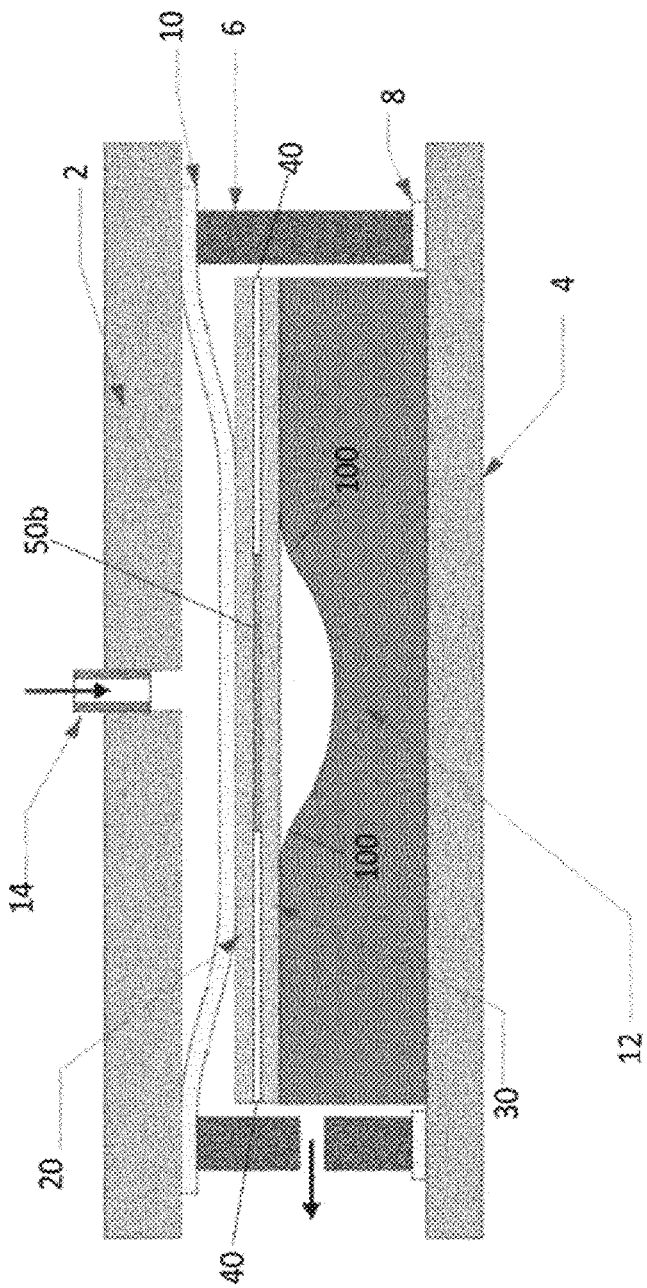
FIG. 4 illustrates an example of forming a curved profile in a LC assembly produced according to another embodiment.

The sum of volume reductions arising from local cell compressions caused by the thermoforming process may, for example, be determined by experimental testing during a setup stage of the manufacturing process. FIG. 4 illustrates a technique for producing a LC intermediate assembly according to another embodiment of the present invention, in preparation for creating a curved profile in the LC intermediate assembly. With reference to FIG. 4, the production of the LC intermediate assembly (in preparation for later thermo-forming) involves locating the laterally inner edge of the adhesive frame 40 (that functions to limit the lateral spread of the LC material) in the curvature inversion region 100 between regions A and B. This method of producing the LC intermediate assembly has been found to be effective for avoiding the occurrence of optical defects in the active region of the LC intermediate assembly after thermo-forming.

Figure 7:
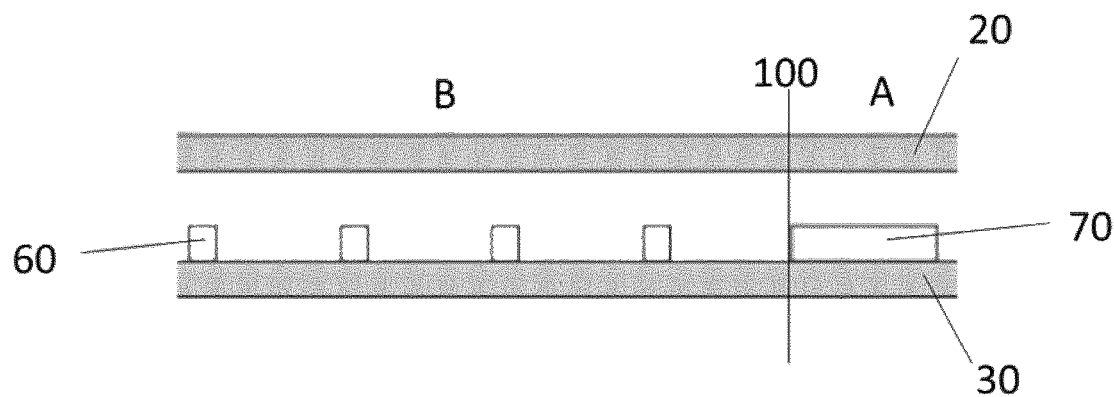
FIG. 7 illustrates a variation of the technique shown in FIG. 4 using a spacer ring as the barrier to laterally contain the LC material.
Figure 8:
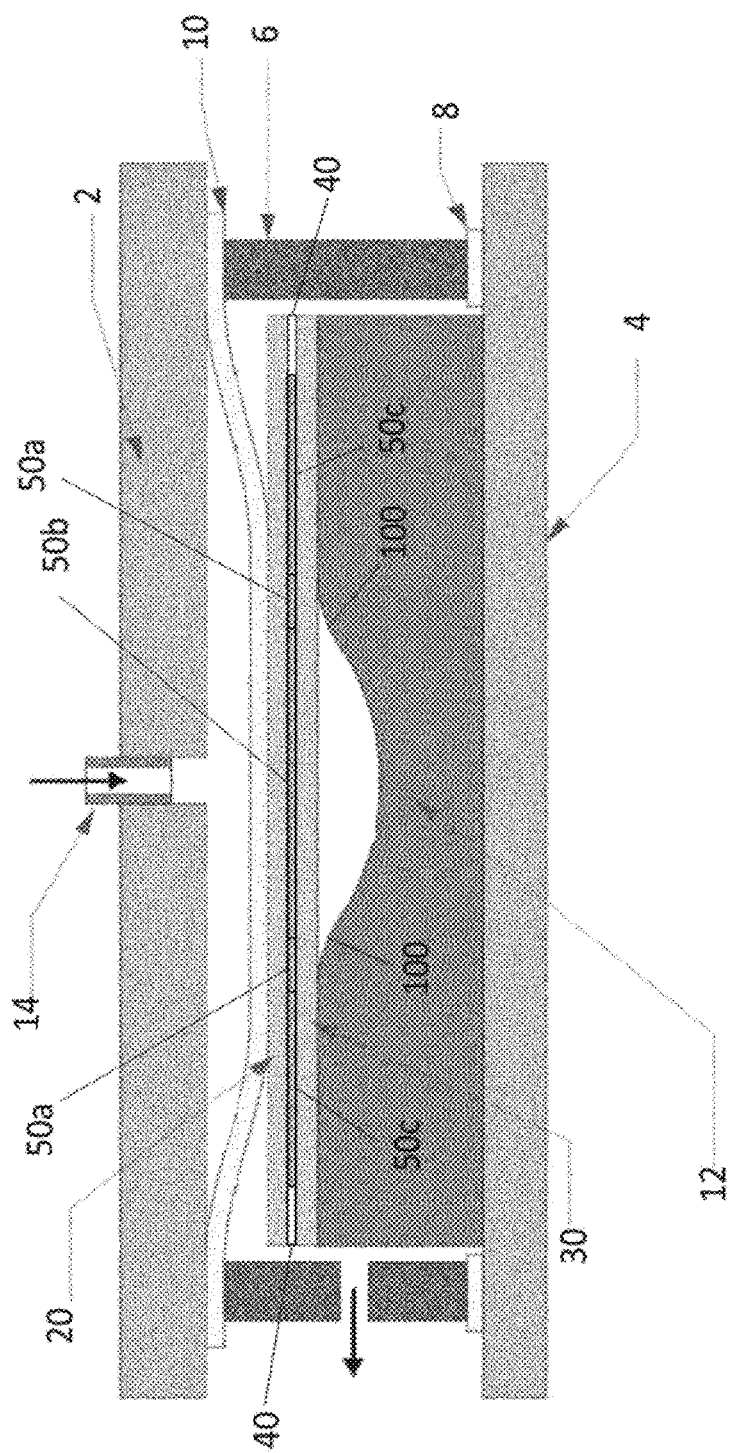
FIG. 8 illustrates an example of forming a curved profile in a LC assembly produced according to another embodiment.

According to one variation illustrated in FIG. 7, a closed ring 70 of spacer material is used instead as the barrier to limit the lateral spread of LC material, and the closed ring 70 of spacer material is located in the curvature inversion region 100 between regions A and B. The closed ring 70 is defined by a patterned layer of spacer material formed in situ on one of the plastics support films. The patterned layer of spacer material also defines an array of spacer columns 60 (which may have e.g. a square, rectangular or circular cross-section) in the active region of the LC intermediate assembly. This array of spacer columns 60 helps to ensure a uniform thickness of LC material across the active region of the LC intermediate assembly. The cell adhesive 40 used to bond the two plastics film components 20, 30 together may be located immediately laterally outwards of the spacer ring 70.

FIGS. 8 to 13 illustrate a technique of producing an LC intermediate assembly according to a second embodiment. In this second embodiment, the barrier (e.g. cell adhesive 40) that limits lateral spread of the LC material is located outwards of high curvature region A, and the array of spacer columns 60 extending across regions B and A is configured to compensate for variations across the active region in pressure applied to the LC intermediate assembly during thermo-forming. FIGS. 9 to 13 show different examples for configuring the array of spacer columns 60. Each of FIGS. 9 to 13 illustrate the configuration of the spacer columns 60 immediately after patterning the spacer material layer to define the spacer columns 60, and before any compression of the spacer columns 60 either as a result of the process of bonding the two plastics film components 20, 30 together, or as a result of the later thermo-forming process.

Figure 9:
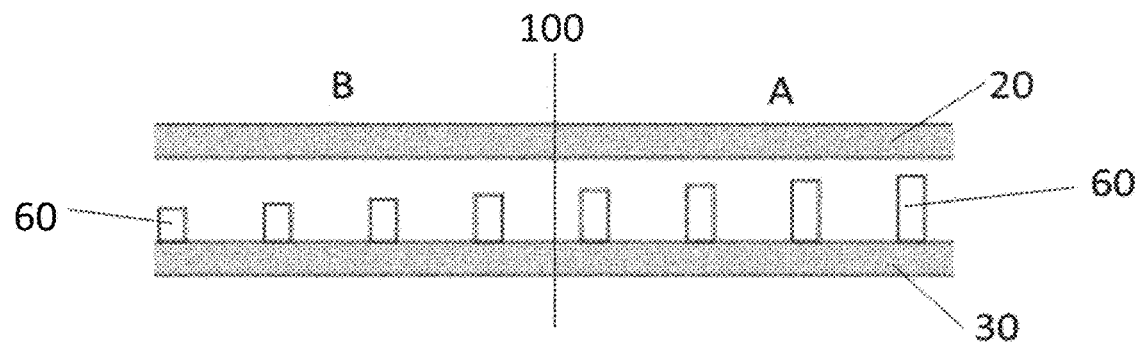
FIGS. 9 to 13 illustrate different examples of varying the spacer configuration in the technique of FIG. 8.

In the example of FIG. 9, the starting height of the spacer columns 60 is gradually varied across the curvature inversion region 100 in proportion to the predicted amount of local pressure applied during the thermo-forming process.

Figure 10:
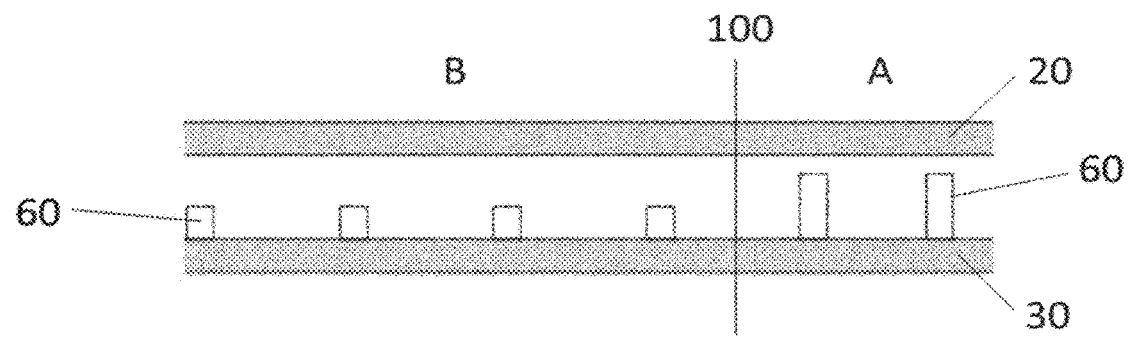

In the example of FIG. 10, the spacer columns 60 in the low curvature region B all have substantially the same starting, height, and all the spacer columns 60 in high curvature region A have substantially the same starting height, but the starting height of the spacers in high curvature region A is greater than the starting height of the spacer columns 60 in low curvature region B by an amount that (taking into account the compressibility of the spacer columns 60) is calculated to compensate for the higher pressure applied to high curvature region A during the thermo-forming process.

Figure 11:
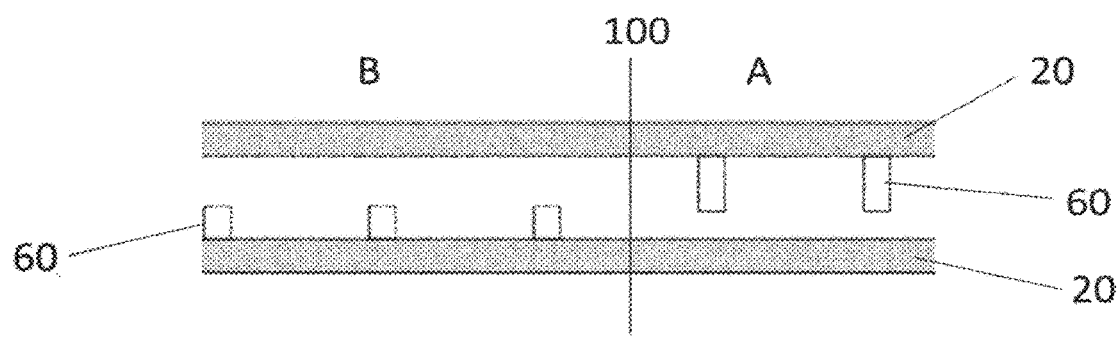

The example of FIG. 11 is a variation of the example of FIG. 10 in which the spacer columns 60 are defined by both plastics film components 20, 30. The taller spacer columns 60 are all defined by one of the two plastics film components 20, 30, and the shorter spacer columns 60 are all defined by the other of the two plastics film components 20, 30.

Figure 12:
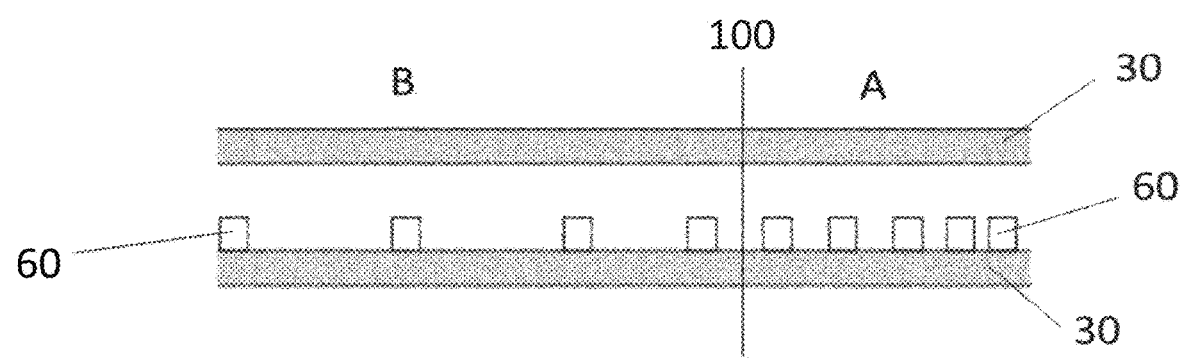

In the example of FIG. 12, all of the spacer columns 60 have the same starting height and cross-sectional size (diameter), but the spacer column density is varied between regions B and A across the curvature inversion region 100 by varying the number of spacer columns 60 per unit area (i.e. by varying the spacer column pitch) in accordance with the variation in pressure applied to regions A and B during the thermo-forming process. The number of spacer columns 60 per unit area is greater for higher curvature region A than it is for low curvature region B. The change in spacer columns per unit area may be done gradually across the curvature inversion region 100.

Figure 13:
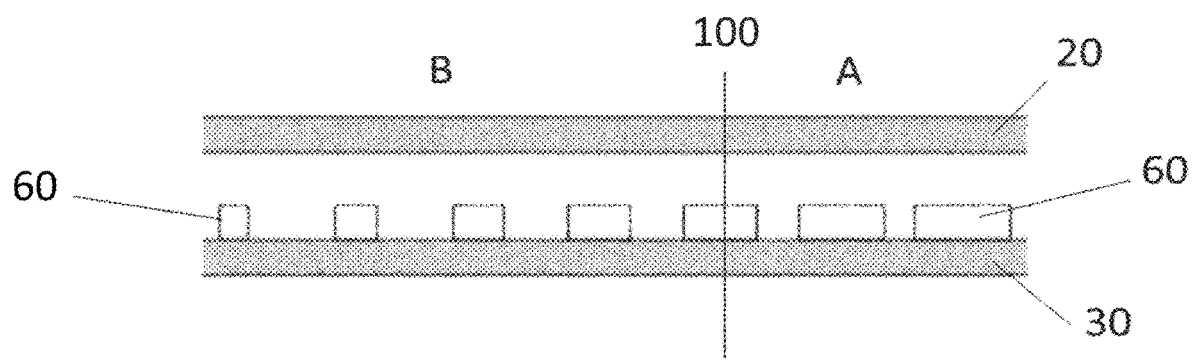

In the example of FIG. 13, all of the spacer columns 60 have the same starting height and the spacer column pitch is the same for both regions A and B, but the spacer column density is instead varied between regions B and A across the curvature inversion region 100 by varying the cross-sectional size (diameter) of the individual spacer columns between regions A and B across curvature inversion region 100 in accordance with the variation in pressure applied to regions A and B during the thermo-forming process. The individual spacer column cross-sectional size is greater for high curvature region A than it is for low curvature region B. The change in individual column spacer cross-sectional area may be done gradually across curvature inversion region 100.

According to another technique for producing a LC intermediate assembly in preparation for creating a curved profile in the LC intermediate assembly, the total amount of LC material contained between the two plastics film components 100 within the barrier limiting lateral spread of the LC material is tuned to take into account at least the variation (across the active region of the LC intermediate assembly) in pressure applied to the LC intermediate assembly during the later process of creating a curved profile in the LC intermediate assembly. Reducing the total amount of LC material can better prevent variations in pressure applied to the LC intermediate assembly causing excessive pooling of LC material in some parts of the active region of the LC intermediate assembly. The determination of the amount of LC material may also take into account additional factors, such as e.g. stretching of the assembly when creating the curved profile.

In addition to any modifications explicitly mentioned above, it will be evident to a person skilled in the art that various other modifications of the described embodiment may be made within the scope of the invention.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features.

The invention claimed is:

1. A device, comprising:
an assembly having a curved profile comprising a change in curvature in a first region of the assembly, wherein the assembly comprises liquid crystal material contained between two halves of the assembly in a region bounded by a barrier, the barrier configured to limit the lateral spread of the liquid crystal material; and wherein the barrier is located in the first region of the assembly.

2. The device according to claim 1, wherein the change in curvature comprises a curvature inversion.

3. The device according to claim 1, wherein the change in curvature comprises a change from a lower curvature inward of the first region to a higher curvature outward of the first region.

4. The device according to claim 1, wherein the curved profile in the assembly is created by biaxial distortion of the assembly, and the first region bounds an inner region of the assembly.

5. The device according to claim 1, wherein the barrier comprises adhesive that bonds the two halves of the assembly together.

6. The device according to claim 1, wherein the barrier is defined by a spacer layer forming part of one of the halves of the assembly, wherein the spacer layer also defines an array of spacer columns.

7. The device according to claim 6, wherein the halves of the assembly are bonded together by adhesive located outwards of the barrier.

8. A device, comprising:
an assembly having a curved profile comprising first and second regions, wherein the first region has a higher curvature than the second region;
wherein the assembly comprises liquid crystal material contained between two halves of the assembly,
wherein at least one of the halves of the assembly defines spacer columns in at least an active region of the assembly; and
wherein the spacer columns have a higher volume density in the first region than in the second region.

9. The device according to claim 8, wherein the spacer columns have a higher starting height in the first region than in the second region.

10. The device according to claim 8, wherein the spacer columns exhibit a higher area density in the first region than in the second region.

11. The device according to claim 10, wherein the spacer columns exhibit a higher number of spacer columns per unit area in the first region than in the second region.

12. The device according to claim 10, wherein the spacer columns have a higher individual cross-sectional area in the first region than in the second region.

13. The device according to claim 6, wherein the array of spacer columns comprises spacer material, and the barrier comprises a closed ring of the spacer material.

* * * * *